(12) United States Patent  (10) Patent No.: US 7,918,294 B2
Smith et al.  (45) Date of Patent: Apr. 5, 2011

(54) TRACTOR UNIT AND HITCH

(75) Inventors: Matthew Joseph Smith, Brailsford (GB); Steve Mather, Hilton (GB)

(73) Assignee: Nu-Star Material Handling Ltd., Derbyshire (GB)

( * ) Notice: Subject to any disclaimer, the term of this patent is extended or adjusted under 35 U.S.C. 154(b) by 387 days.

(21) Appl. No.: 11/631,048

(22) PCT Filed: Jun. 29, 2005

(86) PCT No.: PCT/GB2005/002543
§ 371 (c)(1),
(2), (4) Date: Apr. 29, 2009

(87) PCT Pub. No.: WO2006/000822
PCT Pub. Date: Jan. 5, 2006

(65) Prior Publication Data
US 2009/0205882 A1  Aug. 20, 2009

(30) Foreign Application Priority Data
Jun. 29, 2004 (GB) .................................. 0414511.6

(51) Int. Cl.
*B62D 51/04* (2006.01)
(52) U.S. Cl. ...................... 180/19.1; 180/19.2; 180/19.3; 180/904
(58) Field of Classification Search .................. 180/19.1, 180/19.2, 19.3, 904
See application file for complete search history.

(56) References Cited

U.S. PATENT DOCUMENTS

| 4,955,777 | A  | * | 9/1990  | Ineson ............................ 414/426 |
| 5,573,078 | A  | * | 11/1996 | Stringer et al. ............... 180/19.2 |
| 6,663,132 | B1 | * | 12/2003 | Kizy ........................... 280/479.1 |
| 6,871,714 | B2 | * | 3/2005  | Johnson ....................... 180/19.2 |
| 7,219,754 | B2 | * | 5/2007  | Johnson ....................... 180/19.2 |
| 7,597,522 | B2 | * | 10/2009 | Borntrager et al. ............ 414/347 |
| 7,712,558 | B2 | * | 5/2010  | Helson et al. ................. 180/19.3 |

FOREIGN PATENT DOCUMENTS
GB  1564654  4/1980
GB  2279934  1/1995
GB  2334016 A  8/1999

* cited by examiner

*Primary Examiner* — Joanne Silbermann
*Assistant Examiner* — Marlon A Arce
(74) *Attorney, Agent, or Firm* — Kirschstein, et al.

(57) ABSTRACT

A powered load-moving tractor unit for moving a wheeled load comprises a tractor body with two powered ground-engaging tractor wheels steerable by a tiller and a draw bar for connecting the tractor body to the load through a releasable load hitch. To steer the load, the tractor body can be moved pivotally about a vertical axis relative to the draw bar. That vertical axis is defined by the two halves of a turntable mounted on the tractor body directly over the axis of rotation of the steerable ground-engaging wheels. The draw bar is rigidly connected over the top half of the turntable and extends down the front of the tractor body to the load hitch. The load hitch comprises telescopically inter-engageable elements on the draw bar and the load, and a latch mechanism that is remotely releasable from the end of the draw bar remote from the load hitch.

11 Claims, 4 Drawing Sheets

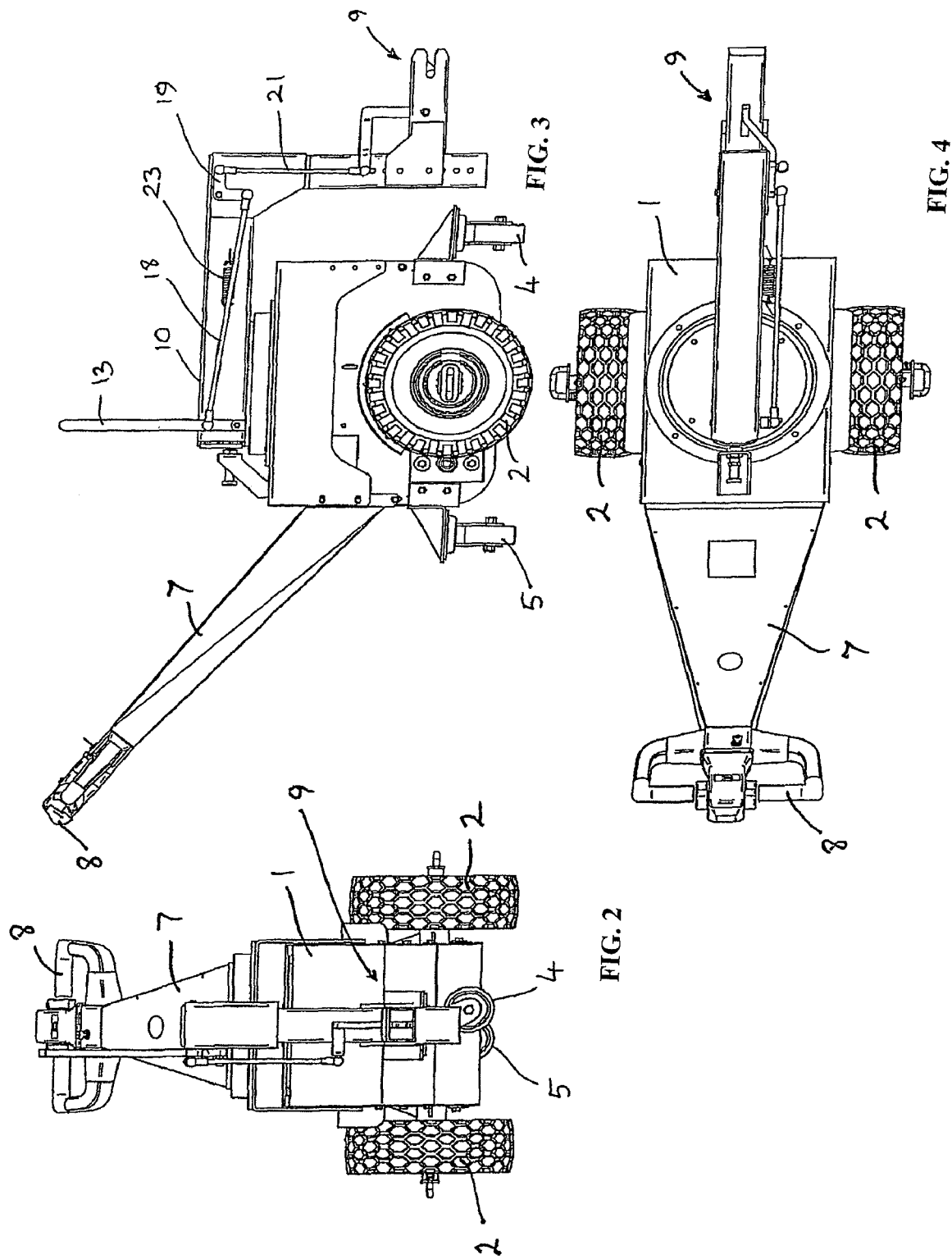

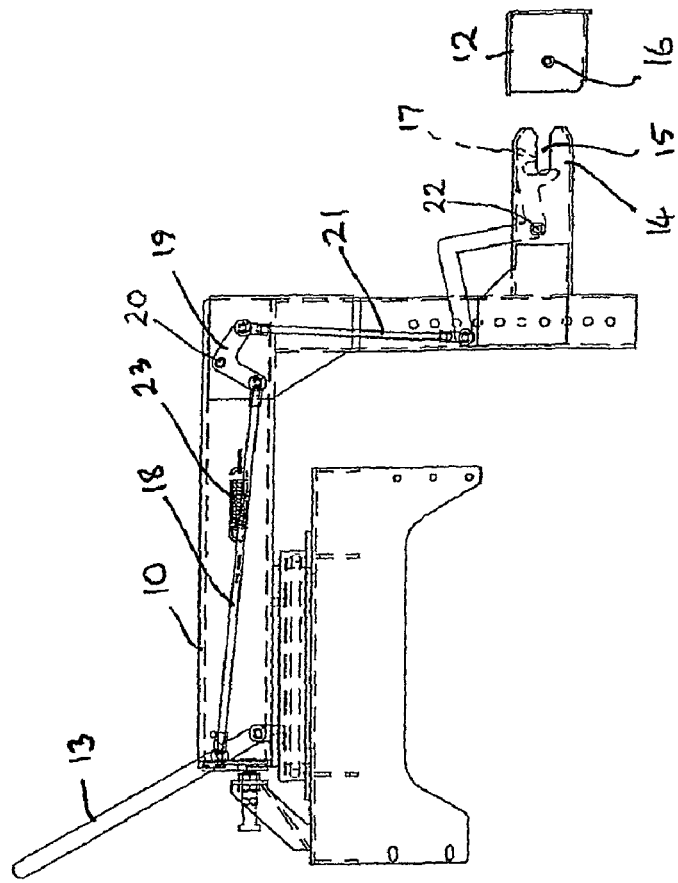
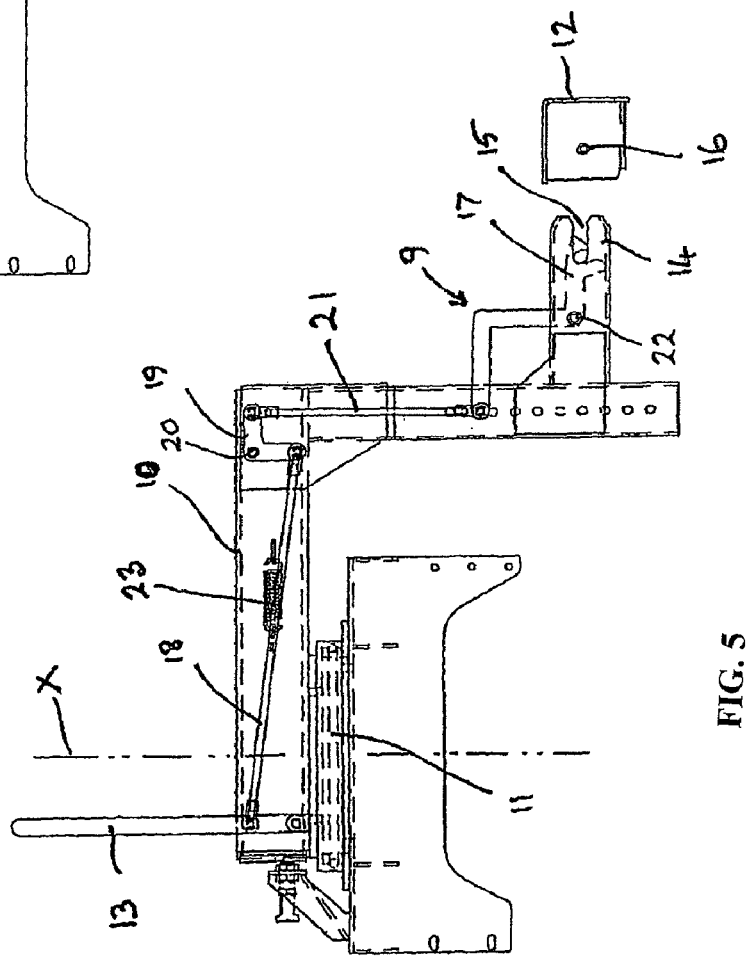
FIG. 6
FIG. 5

ND HITCH

FIELD OF THE INVENTION

The invention relates to a powered load-moving tractor unit for moving a wheeled load, having a releasable load hitch for connecting together the tractor unit and the load.

BACKGROUND ART

Extremely heavy loads such as metal castings, possibly weighing several tons, occasionally have to be moved around factory premises on wheeled trolleys. It is not always possible to pick up the load on a crane or overhead conveyor to move it from one part of the factory site to another. Load-moving tractor units are therefore available for pulling or pushing a heavy load on a wheeled trolley to different parts of the factory site. Typically such load-moving tractor units comprise one or two steerable ground-engaging tractor wheels which can be powered by an on-board motor which could be an internal combustion engine but more generally is an electric motor, either mains powered or battery powered. A coupling including a releasable load hitch is provided between a draw bar of the tractor unit and the load. The coupling provides a substantially rigid connection between the tow bar or the tractor unit and the wheeled load, because the trolleys on which such loads are transported run on castor wheels, and greater steering control can be obtained while moving the load when there is no free movement between the tractor unit and the wheeled trolley supporting the load. In addition the coupling must establish a weight transfer mechanism between the tractor unit and the load in use, so that some of the weight of the load is transferred to the tractor wheels in use. Only in this way is a tractor unit weighing a couple of tens of kilograms able to move a load of up to several tonnes.

GB-A-2279934 discloses one such tractor unit incorporating a screw jack mechanism for transferring some of the weight of the load onto the tractor unit. First the load is coupled, and then the screw jack is actuated manually to transfer the weight of the load onto the tractor unit. Before decoupling can take place the screw jack must again be actuated, this time to remove the load from the tractor unit. This is necessary because when the weight of the load is transferred to the tractor unit that places a very high stress on the coupling hitch, to such an extent that simple unlatching is impossible.

GB-A-1350705 discloses a similar tractor unit in which the coupling hitch between the tractor unit and the load includes a hydraulic lifting ram to engage beneath a relevant part of the load. Actuation of the ram causes a significant portion of the weight of the load to be transferred to the tractor unit. In effect, the lifting ram which is positioned vertically over the driving wheel of the tractor unit attempts to lift the weight of the load or a significant part of the weight of the load onto the tractor wheel.

Tractor units for moving such extremely heavy loads therefore present substantially different problems from those encountered by push/pull tractor units for moving medium sized loads such as supermarket roll cages. Tractor units for such medium sized loads act to lift a coupled end of the load onto the tractor unit where it acts over the tractor wheel or wheels to increase traction, but as a generality the operator himself can lift the load on and off the tractor unit using the leverage of a steering tiller, and there are no excessive forces acting through the coupling hitch. Both the latching together and the unlatching of such a tractor unit and a medium sized load are operations that can be carried out even when the weight of the load acts through the coupling hitch, and such latch engagement/latch release mechanisms can be operated either immediately adjacent to the coupling hitch or from a remote location.

We the inventors have devised a tractor unit for use with heavy loads which avoids the manual or hydraulic transfer of the weight of the load onto the tractor unit prior to using the tractor unit to move the load. The tractor unit can therefore be hitched up to a wheeled load without any of the weight of the load being transferred to the tractor unit. As soon as the tractor unit is driven forwardly or rearwardly relative to the load, however, there is a weight transfer from the load onto the driving wheels of the tractor unit, so that a relatively lightweight tractor unit can move a load of several tonnes. The weight transfer mechanism is described fully below. Furthermore, we have appreciated that when the forward or rearward drive of the tractor unit is terminated in such a tractor unit, the weight of the load is transferred back from the tractor unit so that the coupling hitch between the tractor unit and the load is no longer under such great stress and the load can easily be decoupled in the no-load condition. That opens up the possibility for the first time of having the latch mechanism actuated remotely from a normal operator position as opposed to having to perform the uncoupling operation from adjacent to coupling hitch.

We have also investigated several alternative designs of couplings, but have found that the majority of apparently robust designs of hitch mechanism fail in use when the load being hitched up and moved weighs several tonnes. We have found that the only satisfactory coupling and hitch mechanism is one which comprises telescopically inter-engaging male and female elements. One of those elements is fixed fast to the draw bar of the tractor unit and the other is fixed fast to the load or to a wheeled trolley in which the load is movable. When the male is received telescopically within the female and latched in position there, the coupling has the necessary degree of rigidity and can also transfer the very substantial loads which may be demanded of it.

THE INVENTION

The invention provides a powered load-moving tractor unit for moving a wheeled load, as specified in claim 1 herein. The releasable load hitch can be latched and unlatched onto the wheeled load with the minimum of time and effort, and the unlatching is from the end of the draw bar remote from the load hitch, so that the user does not necessarily have to leave his control position which typically would be at the end of a steering tiller, with the forward and backward speed controls and brake for the tractor unit being all readily available on the handles of the tiller.

The weight transfer of the load onto the steerable tractor wheels in use is established by the design of the coupling, including both the geometry of the draw bar and the design of the load hitch. A substantially but not completely rigid connection is established between the tractor unit and the load when the two are coupled together. The rigidity of the connection is important. Lateral rigidity should be as tight as possible, so that minimal lateral pivotal movement is permitted between the tractor unit and the load. Some small tolerance is however needed to permit the telescopically inter-engageable elements of the load hitch to slide together into mutual engagement. Vertical rigidity is not as demanding, and indeed some small amount of slack is desirable to absorb the effects of surface undulations in the floor of the factory or warehouse in which the tractor unit of the invention is to be used.

When the tractor unit is driven forwardly or rearwardly relative to the load, the tractor wheels in effect try to drive beneath the upper horizontal portion of the draw bar that is connected to the upper component of the turntable, and this has the effect of transferring a significant proportion of the weight of the load through the draw bar downwardly onto the tractor wheels. A usable amount of traction can therefore be developed at the tractor wheels as a dynamic reaction to the attempted forward or rearward movement of the tractor unit, and loads vastly in excess of the weight of the tractor unit can be pushed, pulled and maneuvered. Steering is preferably by a tiller fast to the tractor body.

All of the weight is transferred through the coupling and the load hitch, and it must be understood that the loads which may be moved by a tractor unit according to the invention are so substantial that they could easily tear apart any insubstantial release mechanism for the load hitch were it not for the fact that the weight transfer from the load to the tractor unit is sufficiently dynamic that the stress on the coupling and load hitch is released when the load movement terminates. Nevertheless it is important that the release mechanism is substantial and robust, because there may be an attempt to actuate the release mechanism while some of the weight of the load is still transferred through the load hitch and coupling to the tractor unit.

Preferably the remote release mechanism comprises first and second link members joined by a bell-crank lever that is pivotally mounted on the draw bar. The first link member is connected at one end to the release lever and at the other end to one arm of the bell-crank lever. The second link member is pivotally connected at one end to another arm of the bell-crank lever and at the other end to the latch mechanism. Preferably the first link member acts in tension. The second link member may however act in compression to push the latch member into its releasing position, or in tension to pull the latch member into its releasing position. A spring member between one of the link members and the draw bar preferably acts to bias the latch member to its latching position, so that latching can readily be achieved simply by moving the tractor unit up against the load hitch element connected to the load. Latching together of the tractor unit and the wheeled load can therefore be achieved easily and rapidly, without the operator having to leave his position at the steering tiller. If the release handle is within reach of the operator standing at the steering tiller, then disengagement of the tractor unit and the wheeled load can also be achieved without the operator having to leave that operating position.

DRAWINGS

FIG. 2 is a front view of the tractor unit of FIG. 1, looking directly towards the draw bar;

FIGS. 3 and 4 are, respectively, a side view and a plan view of the tractor unit of FIG. 1;

FIG. 5 is a side view of the turntable, draw bar and releasable hitch elements only of the tractor unit of FIG. 1, with the releasable latch member of a male portion of the load hitch in a condition ready to accept engagement with a female portion on a wheeled load;

FIG. 6 is a side view of the same components as FIG. 5, but with the releasable latch member being moved by the latch release mechanism into a load unlatching condition.

Figure 1:
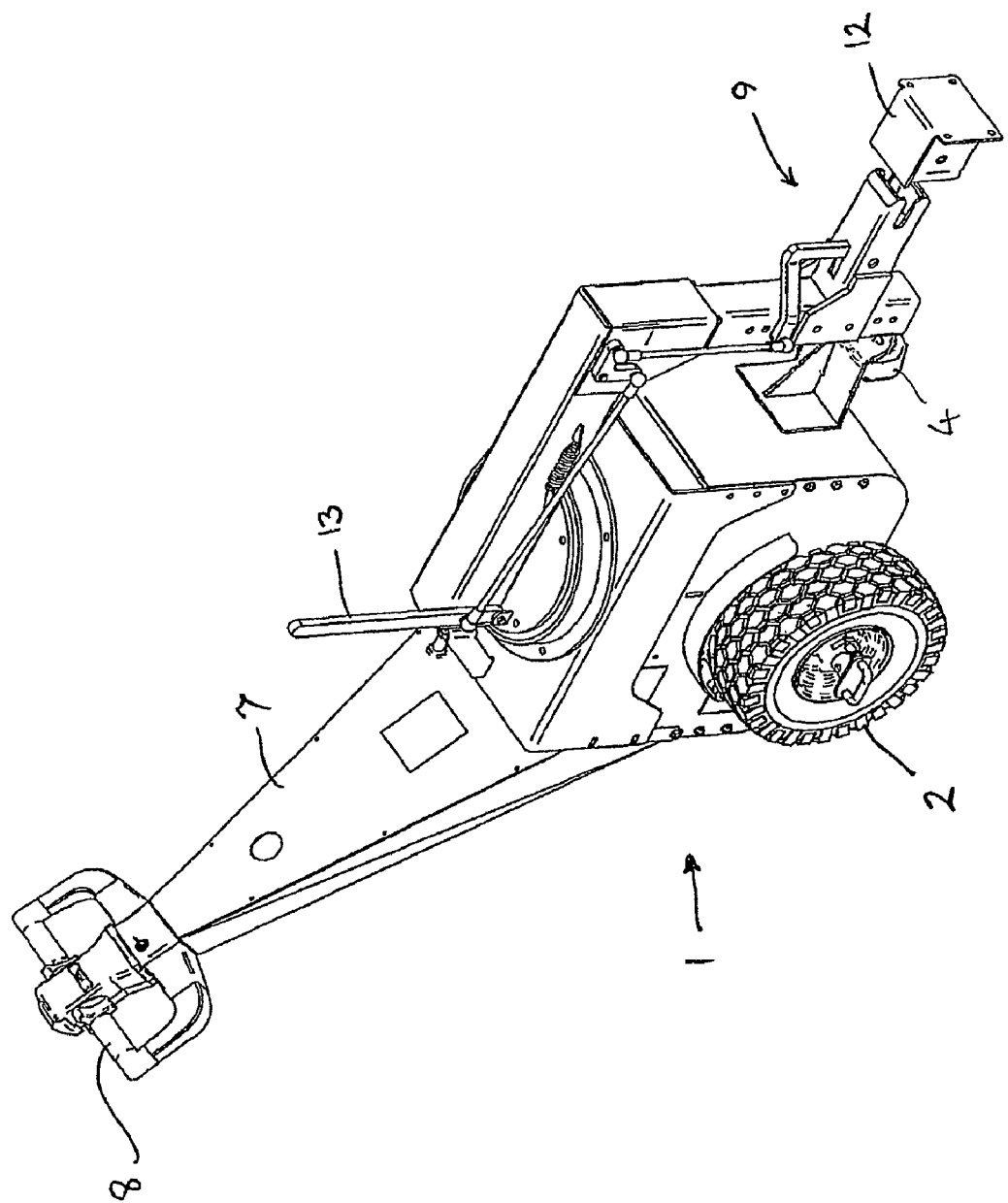
FIG. 1 is a perspective view of a tractor unit according to the invention.

The tractor unit of FIGS. 1 to 4 comprises a tractor body 1 with two steerable ground-engaging tractor wheels 2 mounted at opposite ends of the fixed axle 3 extending transversely of the tractor body 1. One forward castor wheel 4 and one rearward castor wheel 5 are connected to the tractor unit body 1, each at a level slightly clear of the ground so that the tractor unit can tilt forwards and backwards about the wheels 2, but is then prevented from overbalancing by the castor wheel 4 or 5 which touches the ground when the tractor body tilts slightly forwards or backwards.

An onboard motor (not shown) provides the motive power for turning the tractor wheels 2. There is preferably a differential transmission between the motor and wheels 2 so that the tractor unit can easily be steered. Steering is through a tiller 6, with the operator walking along behind the tiller and holding on to handle grips 8 which preferably incorporate switches for controlling the forward and rearward movement of the tractor unit.

A coupling for connecting the load to the tractor unit comprises a releasable load hitch including a male portion 9 which is located at the forward end of a cranked draw bar 10. The draw bar 10 is connected fast to the upper component of a turntable 11 which is rotatable about the vertical axis X marked in FIG. 5. That vertical axis X passes directly through the midpoint of the fixed axle 3, so that the body 1 of the tractor unit can be turned around the vertical axis X to adopt a chosen steering position, without any corresponding movement of the wheeled load. It is only when the power is applied to the tractor wheels 2 of the tractor unit that the load is steered and moved.

Figure 7C:
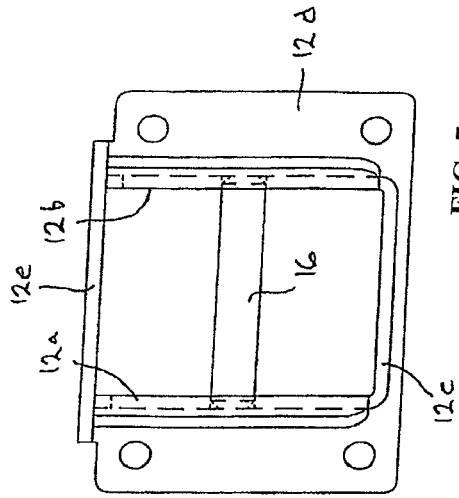
FIGS. 7*a*, 7*b*, 7*c* and 7*d* are respectfully a perspective view, a side view, a front view and a plan view of the female portion of the load hitch shown in FIGS. 5 and 6.
Figure 7D:
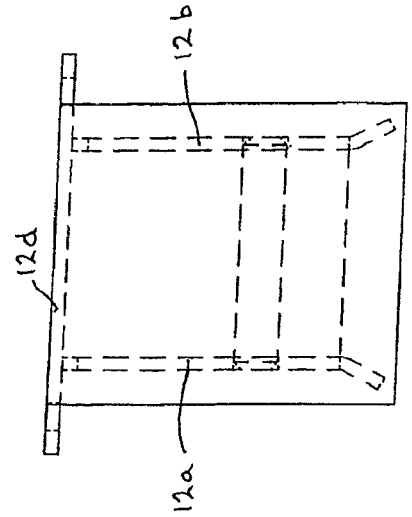
Figure 7B:
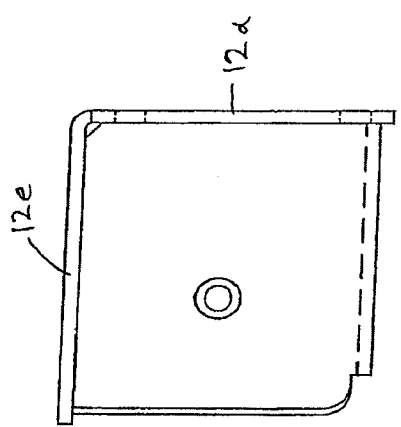
Figure 7A:
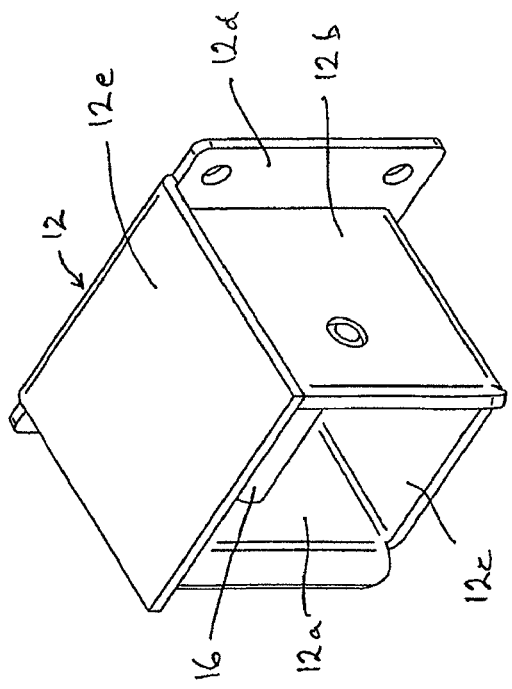

FIGS. 5 and 6 illustrate how the releasable load hitch is used to connect the tractor unit of FIG. 1 to a wheeled load through a connecting piece such as the female portion 12 of FIGS. 7*a*, to 7*d*.

The draw bar 10 is a cranked shape, extending across the turntable 11 at the top of the tractor body and down a front face of the tractor body to the load hitch male portion 9 which is at a lower level than the turntable. The load hitch male portion 9 can be made to be securable to the vertical portion of the draw bar 10 at a variety of alternative heights, or it may be at a single fixed height. If the connected height of the load hitch male portion 9 is variable, then the lengths of the links to be explained below connecting the load hitch to a release lever 13 must themselves be variable in length.

A male portion of the load hitch comprises a hollow rectangular-section channel member 14 extending forwardly in cantilever from the draw bar 10. A horizontal slot 15 is formed in opposite side walls of the channel member 14, and is open in the forward direction. A draw pin 16 extending horizontally across a female portion of the load hitch which is secured to the load or to the load-supporting trolley is received in the horizontal slot 15, and retained in position in that slot by a latch member 17. When the pin 16 passes fully along the slot 15, it raises the latch member 17 by cam action, and the latch member 17 then falls in behind the draw pin 16, to establish a completely secure and rigid linking together of the tractor unit and wheeled load.

A remote release mechanism is provided for the latch member 17. The release lever 13 is pivotally mounted relative to the portion of the draw bar 10 which lies horizontally over the turntable 11. A first link member 18 is pivotally connected to the release lever 13 at one end, and pivotally connected to a bell-crank lever 19 at its other end. The bell-crank lever 19 is itself pivotally connected to the draw bar 10 by a mounting shaft 20, so that horizontal movement of the first link 18 generally to the right or to the left as viewed in FIGS. 5 and 6 causes the bell-crank lever 19 to rotate clockwise or anti-clockwise.

The other leg of the bell-crank lever 19 is pivotally connected to a second link 21 of the latch release mechanism, the link 21 being pivotally connected at its lower end to an end portion of the latch member 17 which is pivotally mounted by means of a heavy duty pivot shaft 22 fast to the side walls of the hollow rectangular-section channel member 14.

In use, the hitching together of the tractor unit and wheeled load is achieved automatically by moving the tractor unit against the load until the draw pin 16 enters the slot 15 and is captured in position by the latch member 17. The latch member 17 is held in its latched position by a spring 23. To release the load, the user grasps and pulls the release handle 13 which can readily be reached from an operating position either behind or immediately adjacent to the tiller 7. Pulling the lever 13 pulls the link 18 and pushes the link 21 (see FIG. 6) and raises the latch member 17 to release the coupling. It has been found that this load hitch and release mechanism is reliable in that it is sufficiently robust to handle loads of several tonnes without failure. Moreover the load release can be accomplished very rapidly by simple movement of the single lever 13 which is well within reach of the operator.

The female portion 12 of the load hitch, shown in greater detail in FIGS. 7*a* to 7*d*, may be bolted, welded or otherwise securely fixed either to the load itself or, more generally, to the wheeled trolley not shown on which the load is supported. The female portion 12 comprises an open-fronted box section which has the draw pin 16 firmly secured to extend horizontally across the interior of the box section at a level to be received in the horizontal slot 15 of the male portion of the load hitch 9 when the male portion is received within the box section. Opposed side walls 12*a* and 12*b* of the box section of the female portion 12 are flared apart at the open end to a width greater than the width of the male portion of the load hitch 9, to assist entry of the male portion into the channel section.

The female portion 12 of the load hitch is made from only two pieces of sheet steel as follows. A first piece comprises the two side walls 12*a* and 12*b* together with a bottom wall 12*c*,. The first piece is cut from sheet steel for example with a cutting laser which also cuts the apertures in the side walls 12*a* and 12*b* to receive the ends of the draw pin 16. The cut metal sheet is folded in a folding press, and the pin 16 is welded into place. A second piece comprises back wall 12*d* and a top wall 12*e*. It similarly is cut using a metal-cutting laser, and is then folded through 90°. The two pieces can then be welded together using seam-welding. This construction provides maximum strength and is economical to fabricate.

The invention claimed is:

1. A powered load-moving tractor unit for moving a wheeled load, comprising a tractor body including a pair of steerable ground-engaging tractor wheels, a steering mechanism for steering the ground-engaging tractor wheels, the steering mechanism including a tiller fast to the tractor body and extending rearwardly therefrom, and a coupling for connecting the tractor body to the load through a releasable load hitch, the coupling including:

a turntable mounted on the tractor body directly over the axis of rotation of the steerable ground-engaging wheels, the turntable having upper and lower components which are pivotally movable one relative to the other while receiving a downward force from the wheeled load to be moved, that downward force being applied along a pivotal axis of the turntable which passes through or substantially through the axis of rotation of the steerable ground-engaging wheels, a draw bar rigidly connected to an upper component of the turntable, across the top of the tractor body and down a front of the tractor body to the load hitch, wherein the load hitch comprises:

telescopically inter-engageable male and female elements of which one is fast to the draw bar and extends forwardly therefrom and the other is fast to the load or to a wheeled trolley in which the load is movable, and a latch mechanism on, in, or associated with the load hitch element fast to the draw bar, for latching around a draw pin on, in, or associated with the load hitch element fast to the load or trolley when the male and female elements are fully engaged one within the other; and a remote latch release mechanism is provided for releasing the latch mechanism from the end of the draw bar remote from the load hitch.

2. A tractor unit according to claim 1, wherein the remote release mechanism for the latch member comprises a release lever pivotally mounted on the draw bar at the end portion remote from the load hitch, a first link member connected at one end to the release lever and at the other end to one arm of a bell-crank lever that is pivotally mounted on the draw bar, and a second link member extending down the front of the tractor body and connected at one end to another arm of the bell-crank lever and at the other end to the latch mechanism.

3. A tractor unit according to claim 2, wherein the first link member acts in tension to release the latch mechanism.

4. A tractor unit according to claim 2, wherein the second link member acts in compression to release the latch mechanism.

5. A tractor unit according to claim 2, wherein a spring member between one of the link members and the draw bar acts to bias the latch member to its latching position.

6. A tractor unit according to claim 5, wherein the latch member has an inclined cam surface formed on a forward facing edge so that movement together of the male and female elements of the load hitch causes the latch member to lift and fall back into latching engagement behind the draw pin.

7. A tractor unit according to claim 1, wherein male element of the load hitch is connected to the draw bar.

8. A tractor unit according to claim 7, wherein the male element of the load hitch comprises a hollow rectangular-section channel member extending forwardly in cantilever from that portion of the draw bar which extends down the front of the tractor body.

9. A tractor unit according to claim 7, wherein the female element of the load hitch comprises an open-fronted box section with the draw pin being firmly secured to extend across the interior of the box section at a level to be received in a transverse slot in the male element of the load hitch when the male element is received within the female section.

10. A tractor unit according to claim 9, wherein the box section comprises opposite side walls which are flared apart at an open end of the channel section to a width greater than the width of the male element of the load hitch to assist entry of the male element into the female element.

11. A powered load-moving tractor unit for moving a wheeled load, comprising a tractor body including a pair of steerable ground-engaging tractor wheels and a coupling for connecting the tractor body to the load through a releasable load hitch, the coupling including:

a turntable mounted on the tractor body directly over the axis of rotation of the steerable ground-engaging wheels, the turntable having upper and lower components which are pivotally movable one relative to the other while receiving a downward force from the wheeled load to be moved, that downward force being applied along a pivotal axis of the turntable which passes through or substantially through the axis of rotation of the steerable ground-engaging wheels, a draw bar rigidly connected to an upper component of the turntable, across the top of the tractor body and down a front of the tractor body to the load hitch, wherein the load hitch comprises:

telescopically inter-engageable male and female elements of which one is fast to the draw bar and extends forwardly therefrom and the other is fast to the load or to a wheeled trolley in which the load is movable, and a latch mechanism on, in, or associated with the load hitch element fast to the draw bar, for latching around a draw pin on, in, or associated with the load hitch element fast to the load or trolley when the male and female elements are fully engaged one within the other; and a remote latch release mechanism is provided for releasing the latch mechanism from the end of the draw bar remote from the load hitch, the remote release mechanism for the latch member comprising a release lever pivotally mounted on the draw bar at the end portion remote from the load hitch, a first link member connected at one end to the release lever and at the other end to one arm of a bell-crank lever that is pivotally mounted on the draw bar, and a second link member extending down the front of the tractor body and connected at one end to another arm of the bell-crank lever and at the other end to the latch mechanism.

* * * * *